United States Patent [19]

Vartanian

[11] Patent Number: 4,943,493
[45] Date of Patent: Jul. 24, 1990

[54] FUEL CELL POWER PLANT

[75] Inventor: George Vartanian, Ellington, Conn.

[73] Assignee: International Fuel Cells Corporation, South Windsor, Conn.

[21] Appl. No.: 342,003

[22] Filed: Apr. 21, 1989

[51] Int. Cl.[5] ............................................. H01M 8/06
[52] U.S. Cl. ...................................... 429/17; 429/20; 429/22
[58] Field of Search ........................ 429/17, 19, 20, 22

[56] References Cited

U.S. PATENT DOCUMENTS

| | | | |
|---|---|---|---|
| 3,607,419 | 9/1971 | Keating et al. | 429/17 |
| 4,202,933 | 5/1980 | Reiser et al. | 429/17 |
| 4,585,708 | 4/1986 | Abens et al. | 429/22 |
| 4,828,940 | 5/1989 | Cohen et al. | 429/20 |
| 4,859,545 | 8/1989 | Scheffler et al. | 429/17 |

Primary Examiner—Donald L. Walton

[57] ABSTRACT

A fuel cell power plant and a method of operating a fuel cell power plant which allows indirect control of the reformer burner flame temperature are disclosed. A hydrocarbon fuel is reformed to provide a hydrogen rich fuel stream and the hydrogen rich fuel stream is oxidized in a fuel cell. A stream of anode exhaust and an oxidant stream comprising cathode exhaust and air are combusted in the reformer burner. The mass flow rate and composition of the oxidant stream are controlled to maintain the oxygen content of the burner exhaust within a predetermined range and thus maintain the flame temperature of the combustion mixture within a preferred range.

5 Claims, 1 Drawing Sheet

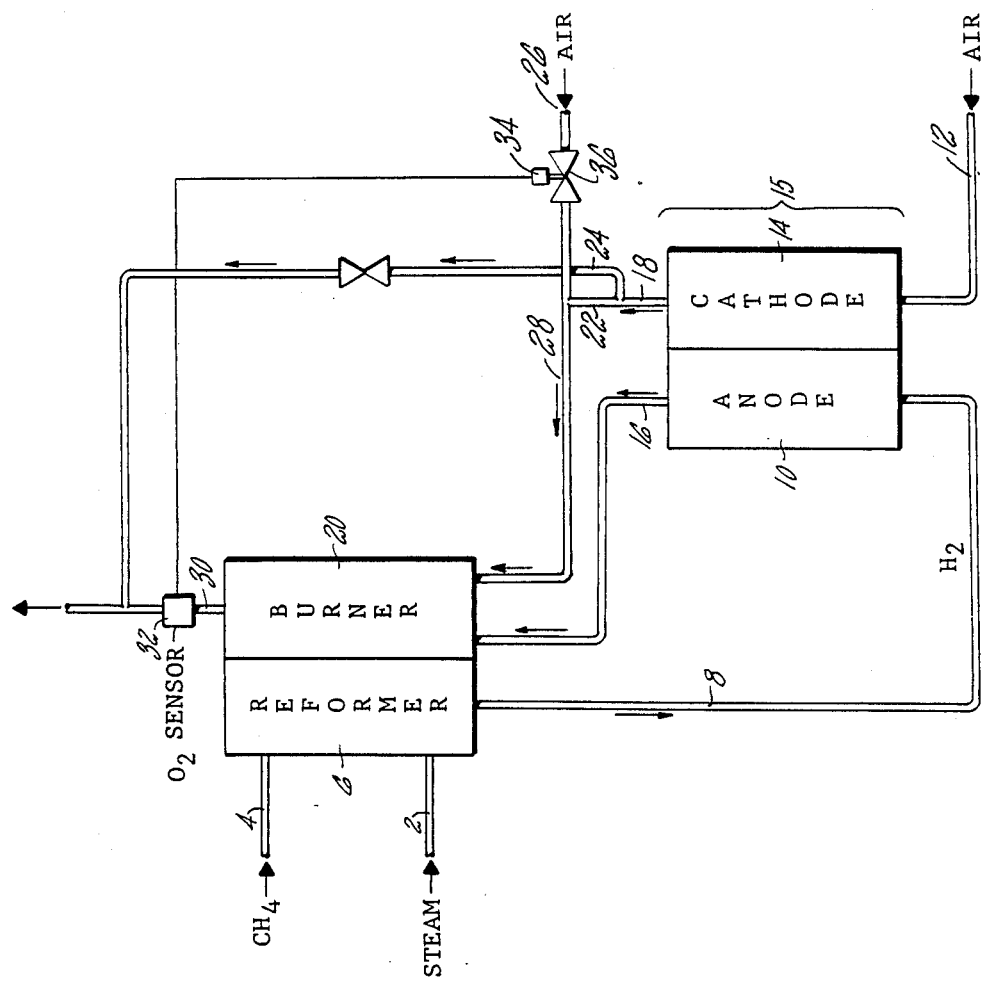

FUEL CELL POWER PLANT

TECHNICAL FIELD

This invention pertains to fuel cell power plant systems.

BACKGROUND ART

A fuel cell is a device for directly converting the chemical energy of a fuel into electrical energy.

A fuel cell comprises two gas diffusion electrodes, an anode and a cathode, and an electrolyte impregnated matrix. The matrix is disposed between the two electrodes. A catalyst layer is disposed on the electrolyte-facing surface of each electrode. In the operation of a typical fuel cell, a hydrogen-containing gas is fed to the back surface of the anode, and an oxygen-containing gas is fed to the back surface of the cathode. The gas is diffused through the electrodes and react at the catalyst sites to yield electrical energy, heat and moisture.

On the anode side of the cell, hydrogen is electrochemically oxidized to give up electrons. The electrical current so generated is conducted from the anode through an external circuit to the cathode. On the cathode side of the cell, the electrons are electrochemically combined with the oxidant. A flow of electrons through the electrolyte completes the circuit.

In large scale fuel cell power plants, the hydrogen rich fuel gas is typically provided by steam reforming a hydrocarbon fuel to produce the hydrogen fuel. A reformer combustor provides heat to the reformer. Anode exhaust from the fuel cell is typically used as fuel in the reformer burner.

Control of the flame temperature within the reformer burner is important as too low a flame temperature results in incomplete combustion of the fuel and a very high flame temperature may exceed the temperature resistance of the burner liner materials.

DISCLOSURE OF INVENTION

A fuel cell power plant is disclosed. The power plant comprises a fuel cell for electrochemically reacting a fuel stream and a first oxidant stream, means for diluting an air stream within cathode exhaust to provide a second oxidant stream and a burner for combusting a mixture of anode exhaust and the second oxidant stream. Means for sensing the oxygen content of the burner exhaust stream and means, responsive to the sensing means, for controlling the mass flow rate of the air stream to maintain the oxygen content of the burner exhaust within a preselected range are also provided.

A method for operating a fuel cell power plant is also disclosed. The method comprises electrochemically reacting a fuel stream and a first oxidant stream in a fuel cell, supplying anode exhaust to a burner, supply a second oxidant stream comprising a mixture of an air stream and cathode exhaust to the burner, combusting the anode exhaust stream and second oxidant stream in the burner, sensing the oxygen content of the burner exhaust stream, providing a signal indicative of the oxygen content, and controlling the mass flow rate of the air stream in response to the signal to maintain the oxygen content of the burner exhaust within a preselected range.

The forgoing and other features and advantages of the present invention will become more apparent from the following description and accompanying drawings.

BRIEF DESCRIPTION OF DRAWINGS

The FIGURE shows a schematic drawing of a fuel cell power plant of the present invention.

BEST MODE FOR CARRYING OUT THE INVENTION

The FIGURE is a schematic diagram of a fuel cell power plant of the present invention. A stream 2 of steam and a stream 4 of hydrocarbon fuel are fed to the reformer 6 to produce a stream 8 of hydrogen rich gas. The stream 8 of hydrogen rich gas is directed from the reformer 6 to the anode 10 of the fuel cell. A stream 12 of air is directed to the cathode 14 of the fuel cell 15. The hydrogen of the hydrogen-rich gas stream 8 is oxidized in the fuel cell 15. A hydrogen depleted anode exhaust stream 16 exits the anode 10 of the fuel cell 15, and an oxygen depleted cathode exhaust stream 18 exits the cathode 14 of the fuel cell 15. The anode exhaust stream 16 is directed from the anode 10 to the burner 20.

The cathode exhaust stream 18 may be split into a diluent stream 22 and a bypass stream 24. The diluent stream 22 is mixed with an air stream 26 to provide an oxidant stream 28. The oxidant stream 28 is directed to the burner 20. The anode exhaust stream 16 and oxidant stream 28 are mixed and burned in the burner 20. A stream of burner exhaust 30 exits the burner. An oxygen sensor 32 is provided to sense the oxygen content of the burner exhaust stream 30. The oxygen sensor 32 provides a signal indicative of the oxygen content of the burner exhaust stream 30. A controller 34 responsive to the signal from the oxygen sensor 32 adjusts a valve 36 to control the mass flow rate of the air stream 26. The bypass stream 24 bypasses the burner 20 and mixes with the burner exhaust stream 30 at a point downstream from the oxygen sensor 32.

The flame temperature of the fuel and oxidant mixture within the burner 20 is an important process variable. If the flame temperature of the fuel and oxidant mixture in the burner 20 is too low, combustion of the mixture will be incomplete, whereas if the flame temperature of the fuel and oxidant mixture in the burner 20 is too high, the temperature resistance of the burner liner materials may be exceeded.

Since it is very difficult to monitor the actual flame temperature of the fuel and oxidant mixture within the burner 20, we have developed an indirect approach to maintaining the flame temperature within a particular range.

A theoretical flame temperature may be calculated for a fuel and oxidant mixture of a given composition. We have found it convenient to define an adiabatic flame temperature and a stoichiometric flame temperature. The adiabatic flame temperature corresponds to the maximum temperature that may be obtained by completely oxidizing an anode exhaust/oxidant combustion mixture of a given composition. The stoichiometric flame temperature corresponds to the maximum temperature that may be obtained by completely oxidizing an anode exhaust stream 16 of a given composition with a stoichiometric amount of oxygen using an oxidant stream 28 of a given composition.

For gas streams of given compositions, combustion efficiency tends to increase with increasing stoichiometric flame temperature. However, the combustion of a combustion mixture of anode exhaust gas of a typical composition and fresh air can generate flame temperatures which exceed the temperature resistance of the reformer burner liner. To ensure complete combustion of the combustion mixture in the reformer burner 20 while ensuring that the temperature resistance of the burner liner is not exceeded, the composition of the oxidant stream 28 and the composition of the combustion mixture in the burner 20 must be controlled so that the stoichiometric flame temperature for the anode exhaust stream 16 and oxidant stream 28 does not fall below 2300° F. while the adiabatic flame temperature of the combustion mixture does not exceed 2900° F. It is preferred that the relative mass flow rates of the anode exhaust stream 16 and the oxidant stream 28 be controlled so that the combustion mixture obtained by mixing the anode exhaust stream 16 and the oxidant stream 28 provides an adiabatic flame temperature between about 2100° F. and about 2700° F.

In the fuel cell power plant of the present invention, the composition and the mass flow rate of the anode exhaust stream 16 and the composition and mass flow rate of the cathode exhaust stream 18 each vary with fuel cell load.

The relative mass flow rate of the diluent stream 22 to the bypass stream 24 may be actively controlled or may be set so that the mass flow rate of the diluent stream 22 varies with fuel cell load. It is preferred, for simplicity, to allow the mass flow rate of the diluent stream 22 to vary with fuel cell load.

The air stream 26 is mixed with the diluent stream 22 to provide the oxidant stream 28 of controlled composition and flow rate that is fed to the burner 20. The mass flow rate of the air stream 26 is actively controlled, and adjustment of the mass flow rate of the air stream changes both the composition and mass flow rate of the oxidant stream 28.

Since actual flame temperatures within the burner 20 are very difficult to measure reliably, actual flame temperature is not monitored. Rather, the mass flow rate of the air stream 26 is adjusted in response to a signal from oxygen sensor 32 so that the oxygen content of the burner exhaust 30 is maintained within a preselected range. Control of the mass flow rate of the air stream 26 allows indirect control of the flame temperature within the burner 20. If the oxygen content of the burner exhaust 30 falls below the lower limit of the range, the mass flow rate of the air stream 26 is increased, to decrease the respective flame temperatures, and if the oxygen content of the burner exhaust exceeds the upper limit of the range, the mass flow rate of the air stream 26 is decreased to increase the respective flame temperatures. Controlling the mass flow rate of the air stream 26 to maintain the oxygen content of the burner exhaust 30 within the desired range thus allows complete combustion without exceeding the temperature resistance of the burner liner materials.

Selection of a particular range of burner exhaust oxygen content is dependent upon the compositions and flow rates of the various process streams involved. We have determined a preferred range of burner exhaust oxygen content of between about 1.5 mole % $O_2$ and 2 mole % $O_2$ for a particular fuel cell system based on computer simulation of the operation of the system. The example illustrates the type of results obtained from such a simulation.

EXAMPLE

The operation of the fuel cell system shown in the FIGURE was modeled for two sets of operating conditions.

Mass flow rates and molar compositions of anode exhaust and cathode exhaust streams representative of operation at 30% capacity were used as a basis for calculating a mass flow rate of air sufficient to provide a 1.5 mole % $O_2$ in the burner exhaust stream. Operating parameters are given in Table I. The mass flow rate of the bypass stream was 10116 $lb$/hr. An adiabatic flame temperature (for the combustion mixture) of 2175° F. and a stoichiometric flame temperature (for a stoichiometric mixture of anode exhaust and oxidant) of 2420° F. were calculated. Operating parameters are given in Table I.

TABLE I

Mass Flow Rate, Molar Flow Rate and Molar Composition of Power Plant Gas Streams at 30% Load

| | Anode Exhaust Stream 16 | Diluent Stream 22 | Bypass Stream 24 | Air Stream 26 | Burner Exhaust Stream 30 |
|---|---|---|---|---|---|
| Mass flow rate (lb/hr) | 3025 | 7680 | 0116. | 5495 | 16200 |
| Molar flow rate (moles/hr) | 108 | 276 | 364 | 190 | 559 |
| Molar composition (mole %) | | | | | |
| $H_2$ | 26.5 | — | — | — | — |
| $CH_4$ | 11.4 | — | — | — | — |
| $CO$ | 1.3 | — | — | — | — |
| $CO_2$ | 55.6 | — | — | — | 14.7 |
| $H_2O$ | — | 12.6 | 12.6 | 1.0 | 15.5 |
| $O_2$ | — | 3.0 | 3.0 | 20.8 | 1.5 |
| $N_2$ | — | 84.4 | 89.4 | 78.2 | 68.3 |

The same procedure was repeated based on the anode and cathode exhaust streams for operation at 100% capacity. Operating parameters are given in Table II. The mass flow rate of the bypass stream was 33245 $lb$/hr. An adiabatic flame temperature (for the combustion mixture) of 2280° F. and a stoichiometric flame temperature (for a stoichiometric mixture of anode exhaust and oxidant) of 2524° F. were calculated.

TABLE II

Mass Flow Rate, Molar Flow Rate and Molar Composition of Power Plant Gas Streams at 100% Load

| | Anode Exhaust Stream 16 | Diluent Stream 22 | Bypass Stream 24 | Air Stream 26 | Burner Exhaust Stream 30 |
|---|---|---|---|---|---|
| Mass flow rate (lb/hr) | 9937 | 27635 | 33245 | 12778 | 50350 |
| Molar flow rate (moles/hr) | 358 | 998 | 1200. | 443 | 1748 |
| Molar composition (mole %) | | | | | |
| $H_2$ | 27.1 | — | — | — | — |
| $CH_4$ | 11.2 | — | — | — | — |
| $CO$ | 1.13 | — | — | — | — |
| $CO_2$ | 54.7 | — | — | — | 14.1 |
| $H_2O$ | 5.87 | 9.0 | 9.0 | 1.0 | 16.2 |
| $O_2$ | — | 6.5 | 6.5 | 20.8 | 1.5 |
| $N_2$ | — | 84.5 | 84.5 | 78.2 | 68.2 |

In each case, maintaining a 1.5 mole % $O_2$ in the burner exhaust stream provided adiabatic and stoichiometric flame temperatures with the preferred ranges.

Although this invention has been shown and described with respect to detailed embodiments thereof, it will be understood by those skilled in the art that various changes in form and detail thereof may be made without departing from the spirit and scope of the claimed invention.

I claim:

1. A fuel cell power plant, comprising:
    a fuel cell, including an anode and a cathode for electrochemically reacting a fuel stream and a first oxidant stream to produce electricity, an anode exhaust stream and a cathode exhaust stream,
    means for diluting an air stream with cathode exhaust to provide a second oxidant stream,
    a burner for combusting a mixture of the anode exhaust stream and the second oxidant stream to produce heat and a burner exhaust stream, said burner exhaust stream having an oxygen content,
    means for sensing the oxygen content of the burner exhaust stream, and
    means, responsive to the sensing means, for controlling the mass flow rate of the air stream to maintain the oxygen content of the burner exhaust within a preselected range.

2. A method for operating a fuel cell power plant, comprising:
    electrochemically reacting a fuel stream and a first oxidant stream in a fuel cell to produce electricity, an anode exhaust stream and a cathode exhaust stream,
    supplying an anode exhaust stream to a burner,
    supplying a second oxidant stream to the burner, wherein the second oxidant stream comprises a mixture of an air stream and cathode exhaust,
    burning a combustion mixture of anode exhaust and oxidant in the burner to provide heat and produce a burner exhaust stream, said burner exhaust stream having an oxygen content,
    sensing the oxygen content of the burner exhaust stream,
    providing a signal indicative of the oxygen content of the burner exhaust stream, and
    controlling the mass flow rate of the air stream in response to the signal to maintain the oxygen content of the burner exhaust within a preselected range.

3. The method of claim 2, wherein controlling the mass flow rate of the air stream to maintain the oxygen context of the burner exhaust within the preselected range provides a combustion mixture having an adiabatic flame temperature between about 2100° F. and 2700° F.

4. The method of claim 2, wherein controlling the mass flow rate of the air stream to maintain the oxygen content of the burner exhaust within the preselected range provides a second oxidant stream having a composition such that a stoichiometric mixture of anode exhaust and the composition has a stoichiometric flame temperature above about 2300° F.

5. The method of claim 2, wherein the oxygen content of the burner exhaust stream is maintained within a range between about 1.5 mole % $O_2$ and about 2.0 mole % $O_2$.

* * * * *